A. W. MORRISON.
APPLIANCE FOR SEALING CAR DOORS.
APPLICATION FILED MAY 24, 1919.
1,320,164. Patented Oct. 28, 1919.
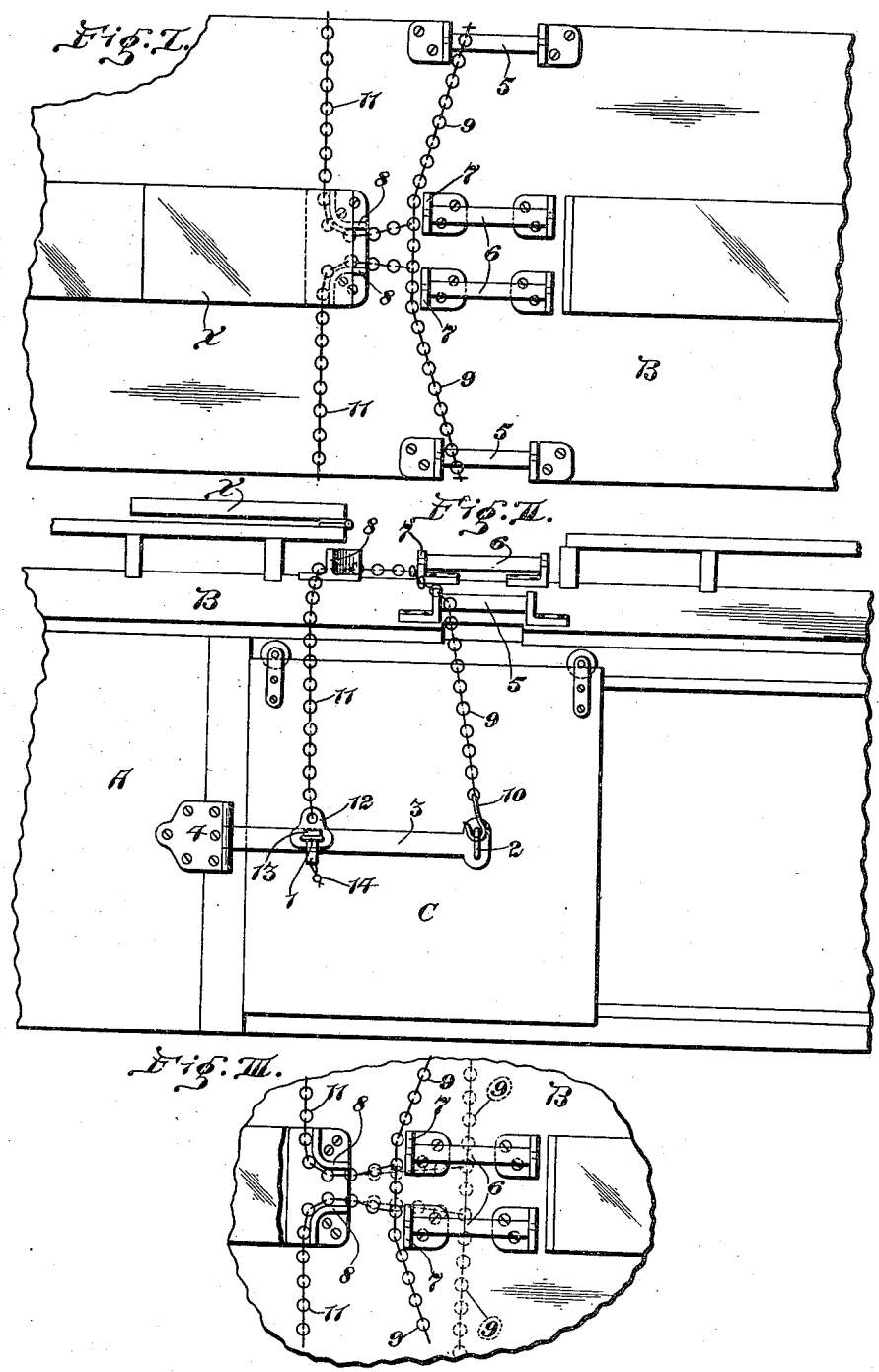

UNITED STATES PATENT OFFICE.

ANDREW W. MORRISON, OF ST. LOUIS, MISSOURI.

APPLIANCE FOR SEALING CAR-DOORS.

1,320,164.     Specification of Letters Patent.     Patented Oct. 28, 1919.

Application filed May 24, 1919. Serial No. 299,610.

*To all whom it may concern:*

Be it known that I, ANDREW W. MORRISON, a citizen of the United States of America, a resident of the city of St. Louis, in the State of Missouri, have invented certain new and useful Improvements in Appliances for Sealing Car-Doors, of which the following is a full, clear, and exact description, reference being had to the accompanying drawings, forming a part of this specification.

My invention relates to an appliance for use in securing and sealing the doors of freight cars in a manner to lessen the opportunity for the opening of such doors in the event of the removal by thieves of seals serving to protect the door fastening means. With this object in view, my appliance comprises door fastening means and in conjunction therewith means for securing said door fastening means extending therefrom to the roof of the car, and controlling means for said fastener securing means whereby the latter may be so held as to prevent release from fastener securing position except by access to the roof of the car. Said controlling means are adapted to be held by seals which must be broken prior to release of the controlling means by access to the car roof.

Figure I is a top plan view of door containing portion of a railway freight car with my appliance in operative condition.

Fig. II is a side elevation of the portion of the freight car and the appliance shown in Fig. I.

Fig. III is a top plan view of the central portion of a car roof and the parts of my appliance on such portion, flexible members being shown taut in full lines and in slack condition by dotted lines.

In the accompanying drawings, A designates one of the side walls of a freight car, B the car roof and C a door for closing a doorway in the wall A. A similar doorway and door are present at the opposite side of the car.

The doors C are provided with staples 1 and 2 spaced from each other, said staples being adapted to receive door fasteners, preferably in the form of hasps 3 secured to the walls A by hinge members 4, or other suitable means.

5 designates side runners mounted on the car roof B adjacent its side edges, and 6 are central runners, preferably in the form of rollers, located in transverse alinement with the side runners 5, the central runners being preferably located at the apex of the roof. At the ends of the runners 6 are abutments 7 offset from a vertical line drawn through the car doors C and the car at the location of the staples 2 when the doors are closed. On the car roof are also vertical runners 8 spaced from each other and separated from the abutments 7.

9 designates a chain or other flexible connection member attachable to the staple 2, preferably by means of hooks 10 at the ends of said connection member. The flexible connection member 9 has connected to it flexible pull members 11, which terminate in staple engaging members 12 adapted to be applied to the staples 1, and to be held thereon by a pin or other seal receiving means passed through said staple and to which seals 14 are applied.

When the car doors with which my appliance is to be used are open, the flexible connection member 9 rests upon the runners 5 and 6 so that it extends transversely of the car with slack therein. When the car doors are to be sealed, the ends of the flexible connection member 9 are secured to the staples 2 after the door fasteners or hasps 3 have been fitted to the staples 1 and 2. The operator then by grasping one of the flexible pull members 11 exerts a pull thereon, whereby the central portion of the flexible connection member is shifted from the central runners 6 and lowered into positions facing the abutments 7 of said runners. The connection member 9 is thereby drawn taut, so that its ends may not be separated from the staples 2 without access to the roof of the car to disengage the connection member 9 from said abutments and replace them on the central runners 6, to provide slack therein which will permit separation of the connection member 10 from the staples 2.

After the flexible connection member 9 has been placed in engagement with the abutment 7 through the medium of one of the pull members 11, the staple engaging members 12 are applied to the staples 1, and the sealing means for holding said staple engaging members are applied to said staples.

It will be readily understood that my appliance provides a door securing and sealing medium which is only partially freed in the event of the breakage of the car seal, and that to completely free the door it is necessary to mount the car roof for the purpose of placing slack in the connection member 9 before it can be disconnected from the door fastener. Inasmuch as car thieves are unlikely to expose themselves by ascending to the roof of a car to free the door connection member 9, their efforts to break into the car will be frustrated. The running board on the roof of a car provided with my appliance is preferably provided with a hinged section which may be raised to obtain access to the flexible members 9 and 11.

I claim:

1. The combination with a freight car having a door, of a door fastener, fastener retaining means extending from said fastener to the roof of the car, an abutment on the car roof to which said fastener retaining means may be adjusted to prevent the release thereof from fastener retaining position, means connected to said fastener retaining means whereby the latter may be moved to engage said abutment, and a holding device for securing said last named means.

2. The combination with a freight car provided with a door, of a door fastener, a runner on the roof of the car, an abutment adjacent said runner, a flexible door fastener retaining member extending onto said runner and movable therefrom into engagement with said abutment, and a pull member connected to said fastener retaining member whereby it may be moved into engagement with said abutment, said pull member being adapted to be secured by a holding device.

In testimony that I claim the foregoing I hereunto affix my signature.

ANDREW W. MORRISON.

Copies of this patent may be obtained for five cents each, by addressing the "Commissioner of Patents, Washington, D. C."